Patented Oct. 19, 1954

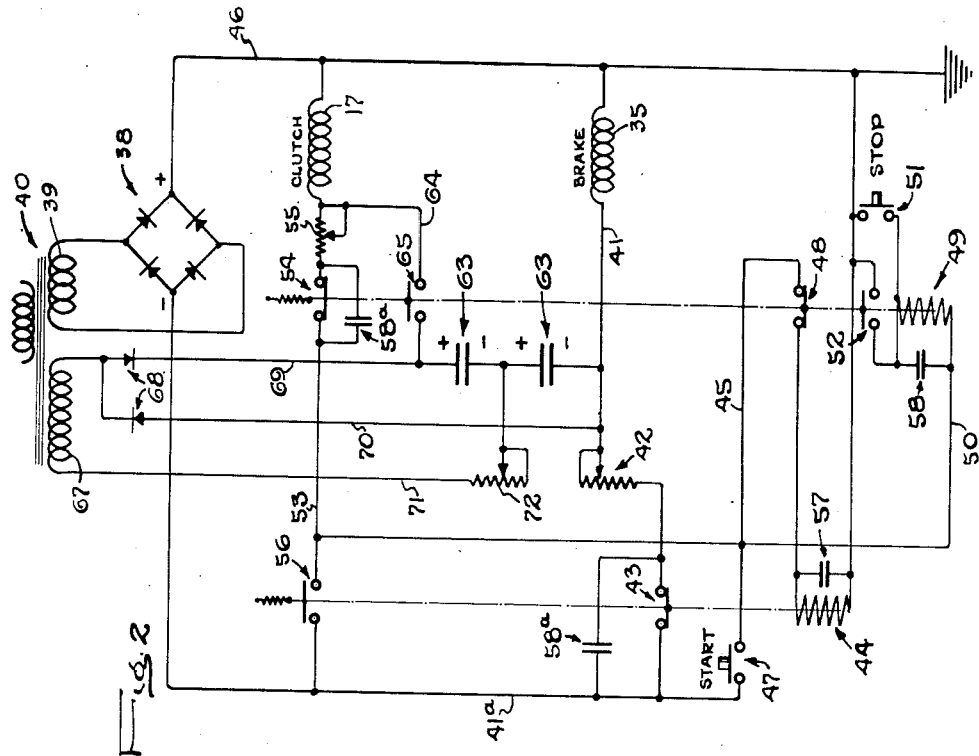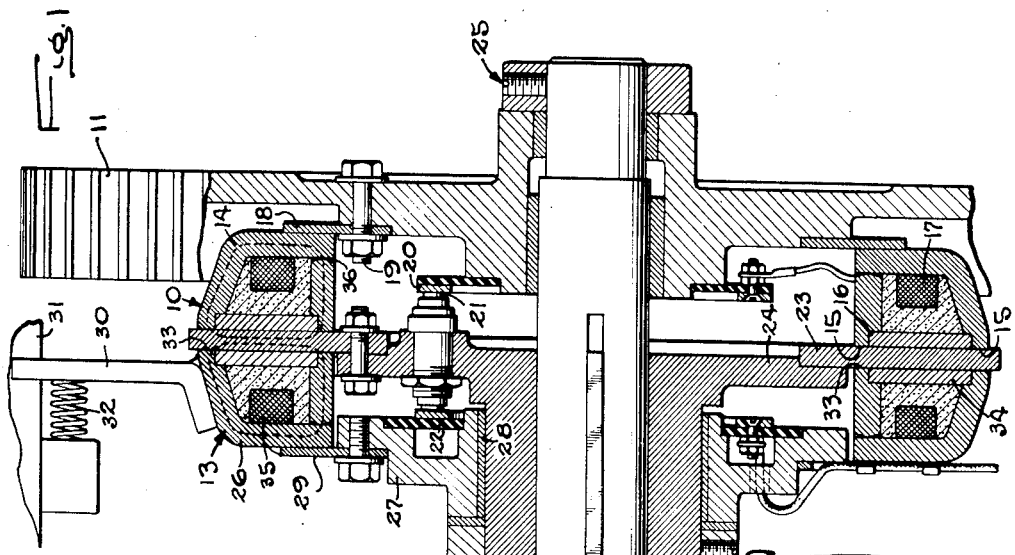

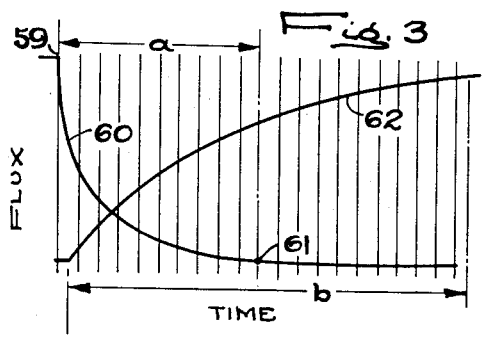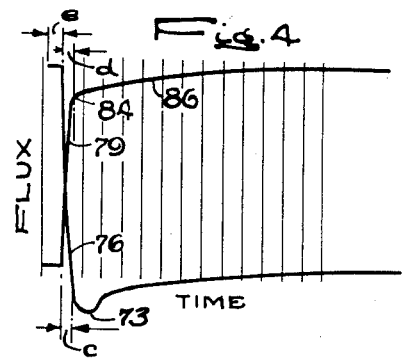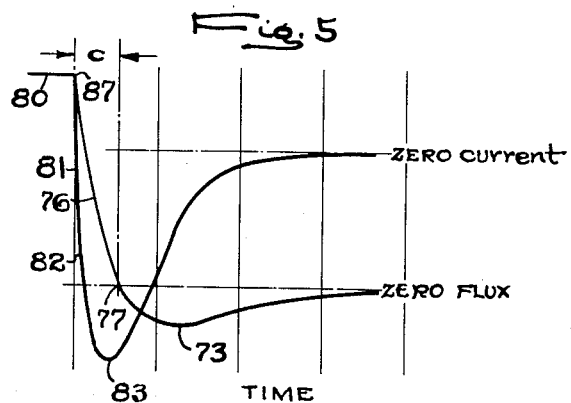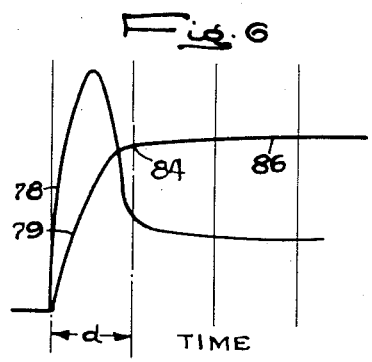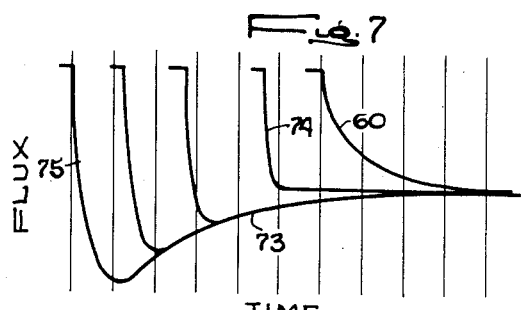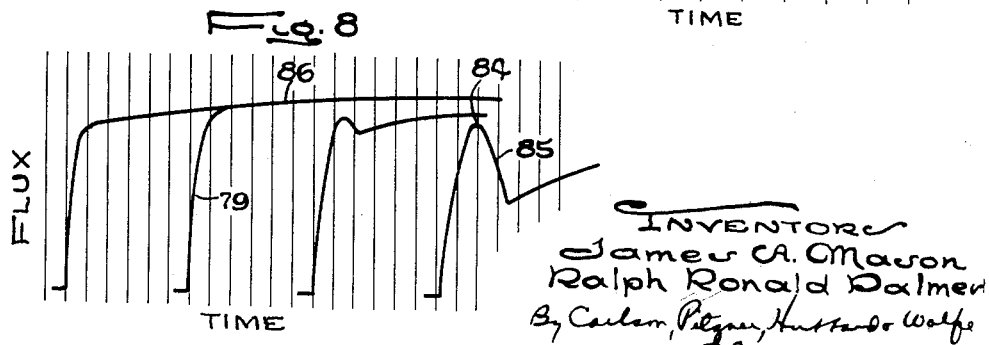

2,692,353

UNITED STATES PATENT OFFICE 2,692,353

CONTROL FOR ELECTROMAGNETS

James A. Mason and Ralph Ronald Palmer, Beloit, Wis., assignors to Warner Electric Brake & Clutch Company, South Beloit, Ill., a corporation of Illinois Application October 14, 1950, Serial No. 190,176

18 Claims. (Cl. 317—123)

This invention relates to the control of an electromagnet having a multiturn annular winding enclosed by a magnetic flux circuit which is solid or unlaminated throughout the major portion of its length.

In such magnetic devices, the attractive force developed does not follow closely the changes in the current energizing the magnet winding but instead lags the current by an interval which, although only a fraction of a second, is nevertheless objectionably long for many installations requiring substantially instantaneous action by the magnet. Heretofore this detrimental lag has been attributed to the inherently high inductance of the magnet and, accordingly, attempts have been made to overcome the lag by applying a momentary over-voltage to the magnet but only a small part of the total lag may be overcome by this method.

We have discovered that the major portion of the detrimental lag is due, not to inductance, but rather to another characteristic of torque transmitting devices, that is, eddy or other currents of substantial magnitude generated in the heavy unlaminated iron sections of the magnet and armature as the energizing current in the winding is changing following interruption or closure of the circuit therethrough. These currents in themselves create a parasitic magnetic flux which acts independently in opposing the building up of the normal flux when the magnet winding is energized and which prolongs the attraction between the magnetic elements following interruption of the winding circuit.

Based on the foregoing discovery, the primary object of the present invention is to provide a new and improved means and method for effectually reducing and substantially eliminating both of the detrimental lag producing factors above referred to.

A more detailed object is to store a measured quantity of electrical energy corresponding to and capable of overcoming or neutralizing the parasitic effect above referred to and to apply such energy at a voltage sufficiently high to minimize the time required to overcome the inductance.

Another object is to deliver the stored electrical energy in a novel manner in timed relation to the interruption or closure of the circuit through the magnet winding.

A further object is to provide a novel mechanism for synchronizing the action of the flux produced momentarily by the stored energy and the normal flux by which the energization of the magnet is continued whereby to avoid the necessity of timing precisely the initial application of the normal energizing current.

A further object is to interconnect the windings of two electromagnets in a novel relation with respect to the energy storing device so that the latter may be utilized to supply the energy for eliminating the time lag both in the release of one magnet and in the building up of the flux in the other magnet.

Other objects and advantages of the invention will become apparent from the following detailed description taken in connection with the accompanying drawings, in which.

Figure 1 is a fragmentary diametrical cross-sectional view of a power transmitting system adapted to be controlled in accordance with the present invention.

Fig. 2 is a wiring diagram of the improved control as applied to an electromagnetic clutch and an electromagnetic brake.

Figs. 3 to 8 are reproductions of oscillographic records showing the magnetic flux and current changes occurring in magnetic clutches and brakes under different conditions, the time divisions on these charts being in sixtieths of a second.

While the invention is susceptible of various modifications and alternative constructions and may be practiced in various ways, we have shown in the drawings and will herein describe in detail the preferred embodiment. It is to be understood, however, that we do not intend to limit the invention by such disclosure but aim to cover all modifications and alternative constructions and methods falling within the spirit and scope of the invention as expressed in the appended claims.

For purposes of illustration, the invention is shown in the drawings as a control for an electromagnetic clutch 10 for transmitting rotary power from a driving element such as a gear 11 to a shaft 12 of a machine to be driven and an associated electromagnetic brake 13 for arresting the motion of the driven shaft 12 following interruption of the current to the clutch. The clutch shown in Fig. 1 by way of illustration is of the direct acting friction type and comprises a magnet ring 14 of U-shaped cross section having concentric axially projecting inner and outer pole pieces terminating in end faces 15 which are flush with each other and with the outer surface of non-magnetic wear resistant segments 16 seated in and rigidly backed by the pole pieces. A coil 17 comprising a multiplicity of turns, for example 200, wound around the clutch axis is enclosed by the magnet ring 14 and fastened securely within the latter. Through the medium of a plate 18 and bolts 19, the magnet is fixed to the driving gear 11.

Current for energizing the coil 17 may be delivered through a slip ring 20 rotatable with the gear 11 and connected to one terminal of the coil, the other terminal being grounded. The ring engages one end of a contact 21 rotatable with the shaft 12 and bearing at its other end against a second insulated slip ring 22.

The pole faces 15 of the clutch magnet are spanned by a generally flat ring 23 of solid magnetic iron which constitutes both the magnet armature and the driven clutch member and which is bolted rigidly to a disk 24 whose hub is keyed to the driven shaft. The gear 11 floats freely on the shaft 12 so that the coacting faces of the magnet and armature may, while the magnet is deenergized, be held in close proximity to each other by an axially adjustable thrust member 25.

The brake 13 is also of the direct acting type preferably of the same general construction as the clutch and, to simplify the mounting of the brake and clutch parts, the armature ring 23 of the clutch may also constitute the armature of the brake. The brake magnet comprises a solid or unlaminated iron ring 26 of U-shaped cross section supported through a ring 27 and a bearing 28 therein on the hub of the disk 24, the ring 27 being in this instance bolted to a plate 29 welded to the back of the magnet ring. To hold the magnet against turning while providing some freedom of axial floating thereof, an arm 30 is made rigid with the magnet ring and projects loosely into a part 31 rigid with the frame which supports the driven shaft. Suitable light spring means 32 urges the magnet axially with sufficient force to overcome the commutator brush pressure and insure the maintenance of proper contact between the brake parts.

The pole pieces of the magnet 26 terminate in outer and inner end faces 33 which are flush with each other and with the outer face of non-magnetic wear-resistant segments 34 seated on shoulders of the pole pieces. A coil 35 is secured rigidly between the pole pieces of the magnet ring and may comprise about 200 turns.

In the clutch and brake described above, the magnetic flux circuits indicated by the dotted lines in Fig. 1 encircle the magnet coils and are substantially closed at all times. The parts of the circuits formed by the two magnetic elements are, in direct acting friction clutches and brakes of the type shown, composed of solid iron and are unlaminated. To reduce residual magnetism, narrow gaps 36 of non-magnetic material may, if desired, be interposed in the magnetic flux circuits.

For a reason to appear later, current for normal energization of the windings 17 and 35 to maintain the clutch engaged or the brake applied is derived from a rectifier 38 which may be of the selenium dry plate type. The input terminals are connected across an alternating current source such as the secondary 39 of a transformer 40 by which a primary voltage is stepped down to a desired value, for example 12 volts. One output terminal of the rectifier, the positive terminal in this instance, is connected by a conductor 46 to the ground terminals of the brake and clutch windings. The insulated terminal of the brake winding 35 is connected to the other rectifier output terminal through a conductor 41, 41a which includes in series a manually adjustable resistance 42 and a switch 43 which is closed when the coil of a relay 44 is deenergized.

The circuit for the relay coil 44 extends from a conductor 41, 41a to the grounded conductor 46 through a conductor 45, a normally open switch 47, and a switch 48 which is closed when a relay 49 is deenergized. The coil of the latter relay is in a conductor 50 which connects the conductors 45 and 46 and includes in parallel a normally open switch 51 and a holding switch 52 which is normally open but closed when the relay 49 is energized. Although the start and stop switches 47 and 51 are shown as of the manually operable push button type, they may be operated automatically as is desirable in correlating the action of the clutch and brake with the cycle of a machine driven through the clutch.

The clutch winding 17 may be energized by closure of the start switch 47 to complete a circuit including the conductor 45, a conductor 53, a switch 54 which is normally closed when the relay 49 is deenergized, and an adjustable resistance 55. A holding circuit for the clutch winding is controlled by a switch 56 which is closed only when the relay 44 is energized.

Condensers 58a of suitable capacity are connected across the various relay switches to minimize arcing at the contacts. For purposes to appear later, the action of the switches of each relay following interruption of their energizing circuits is delayed momentarily by connecting condensers 57 and 58 across the relay coils. In the case of the relay 44, the delay is determined accurately by correlating the capacity of the condenser 57 with the relay characteristics.

With the circuit thus far described, the clutch energizing circuit will be completed and the brake circuit interrupted in response to closure of the start switch 47. The first circuit extends to the winding 17 through the then closed switch 54. Closure of the start switch also completes the circuit for the relay 44 through the then closed switch 48. In response to energization of the relay 44, the switch 56 is closed thus completing holding circuits for the clutch winding 17 and for the relay itself. This relay also opens the switch 43 thus deenergizing the winding 35 to release the brake.

The clutch continues to be engaged and the brake is held released until the stop switch 51 is closed to complete the circuit for energizing the relay 49, the latter being locked in by the resulting closure of the switch 52. Opening of the switch 48 by the relay breaks the circuit for the relay 44 whose switches 43 and 56 are closed and opened respectively after a short delay determined by the action of the condenser 57. As a result, the holding circuit for the winding 17 is interrupted to initiate release of the clutch and, substantially simultaneously, energizing current is applied to the brake winding 35.

With the circuit thus far described, the magnetic flux in the iron of the clutch and brake will change as shown in Fig. 3, these curves being for magnets about 15 inches in diameter each having a coil composed of 200 turns of No. 14 wire. Although the current in the clutch winding 17 falls rapidly after opening of the switch 56 at point 59 in Fig. 3, the flux threading the magnetic circuit of the clutch decays slowly as indicated at 60 due largely to the generation, as described above, of eddy currents of substantial magnitude in the iron of the magnet 14 and its armature 23. Substantially complete dissipation of the parasitic flux and release of the clutch is thus delayed until 61, the delay indicated by *a* being .16 of a second in the case of the magnet above described. For the same reason, there is a delay *b* of .38 of a second in the attainment of substantially the full value of the flux in the circuit of the brake which flux increases more gradually as indicated by the curve 62.

The present invention aims to reduce and substantially eliminate the lag *a* by delivering electrical energy to the winding 17 in a direction to oppose the parasitic flux produced by the eddy currents and in a limited amount correlated with the magnitude of the latter and sufficient to neutralize this flux. To accomplish this, the energy is delivered at a high voltage so as to quickly overcome the inductance of the winding.

We have discovered that the energy thus required to cause very rapid decay of the flux in the clutch corresponds closely in amount to the energy required to be applied to the winding 35 in order to effect a correspondingly rapid build up of the useful flux in the brake. Accordingly, the invention, in another of its aspects, contemplates the substantial elimination of the lag *b* above referred to by the application of a measured amount of electrical energy to the brake winding 35 simultaneously with the delivery of the neutralizing energy to the clutch winding 17, the two quantities of energy being preferably derived from a single source and delivered serially in the proper directions through the brake and clutch windings. Herein, the combined energy is stored in a capacitance which is charged from a high voltage source and adapted to be interposed in series with the brake and clutch windings 17 and 35 substantially simultaneously with the opening of the clutch circuit. For this purpose and to utilize capacitors which are readily available commercially, two condensers 63 are employed in the present instance and connected in series across the insulated terminals of the windings 17 and 35 by a conductor 64 in which is interposed a switch 65. The latter is normally open but closed in response to energization of the relay 49. Opening of the switch 54 and closure of the switch 65 are, in this instance produced by the same movement of the relay armature but occur successively so that the clutch winding 17 is actually disconnected from the low voltage source before the condenser discharge circuit is closed by the switch 65. It will be obvious that an electronic switch of any well known construction may be substituted for the switch 65 with a corresponding reduction in or elimination of the interval *e* (Fig. 4) required for the stored energy to become effective following opening of the clutch circuit.

Through a suitable secondary 67 on the transformer 40 and rectifiers 68, the condensers may be charged from the primary power source which supplies the rectifier 38. To minimize the size of the parts and minimize the voltage required for a given voltage to be delivered by the capacitors 63, the rectifiers 68 are of the half wave type and are connected to the capacitors through a voltage doubling circuit. This is accomplished by connecting one terminal of the transformer secondary to one terminal of each rectifier, the other terminals being joined through conductors 69 and 70 to the corresponding remote terminals of the capacitors 63. A conductor 71 joins the other terminal of the transformer secondary to the common terminal of the condensers through a resistance 72 by which the charging current is adjusted so as to achieve the desired charging voltage. This resistance also performs a current limiting function and enables the capacitors 63 to be discharged without overloading the rectifiers 68. The secondary winding voltage is such that it will produce the desired voltage, in this case 400 volts, when the series connected condensers are charged. With the condensers arranged in the circuit in the manner described above, it will be apparent that they will be charged fully whenever the switch 65 is open and will be discharged through the clutch and brake windings 17 and 35 whenever the switch 65 is closed following energization of the relay 49 by closure of the stop switch 51.

Also, with the circuit described, the positive plate of the condensers 63 are, when the switch 65 is closed, connected to that terminal of the clutch winding 17 which is joined to the negative terminal of the rectifier 38 when the clutch is energized from the latter. Thus, the direction of discharge of the stored energy through the clutch winding is reverse to that of the current flow during the normal low voltage energization of the winding. The desired neutralization of the positive flux persisting in the flux circuit of the clutch is thus achieved. In the case of the brake winding 35, however, the current flow produced by the energy delivered from the condenser is in the same direction as the current flow resulting from connecting the brake winding to the rectifier 38. The flux thus produced by the stored energy as delivered to the brake winding is in a direction to overcome the opposition offered by the magnetic structure to the quick attainment of the desired full flux value.

With the clutch and brake windings and the condensers 63 connected in series through the conductors 41, 46, and 64, the brake winding will receive its share of the stored energy when the switch 65 is closed. If the magnets 14 and 26 are of the same construction, the total energy will be divided equally between the two windings. The use of such a series circuit is made possible by virtue of the fact, as set forth above, that magnetic systems of the clutch and brake offer substantially equal opposition to the decay of the flux from the normal value upon interruption of the current flow and to the build up of the flux to the same value by an equal energizing voltage. In addition to its simplicity, the series circuit is advantageous in enabling a relatively high voltage, for example 400 volts, to be employed while at the same time holding the current in the windings 17 and 35 during the condenser discharge to a reasonable value, the maximum current being in the present instance only about three times the normal current flow when the windings are energized individually from the low voltage source. Such a current for such a short interval may easily be carried by the magnet coils, contacts, and slip rings of designs suited for the low voltage operation.

The invention also contemplates a correlation of the amount of energy delivered from the capacitors 63 to the clutch winding 17 with the energy represented by the parasitic flux persisting in this winding so that the latter flux is fully and quickly neutralized. If the capacitors are sized to just neutralize the parasitic flux, the flux in the clutch iron would change as indicated at 74 (Fig. 7). It has been found that complete release of the clutch may be effected somewhat sooner by employing condensers of a larger energy storage capacity so as to produce a flux curve which dips slightly below zero as indicated at 73 (Fig. 7). The reversed flux thus delivered to the clutch iron has the effect of overcoming residual magnetism making it unnecessary to use the non-magnetic gaps 26 above referred to in the magnetic circuit of the clutch. Of course, it is undesirable to increase the height of the dip below zero unduly and produce flux curves such as 75 in Fig. 7.

With a clutch magnet of the character described above, it has been found that the parasitic flux will be dissipated and residual magnetism overcome in the intended manner when the capacity of each condenser 63 is about 500 microfarads. When charged at 200 volts as described, these condensers stock 20 watt-seconds of energy which, when the switch 65 is closed, is delivered to the clutch and brake windings at the rate of approximately 2000 watts. At this high rate of energy delivered, the current in the clutch winding drops from its full value of 3.5 amperes at 80 (Fig. 5) to zero at 81 and then reverses along the line 82 to a 9 ampere peak 83 substantially ahead of the flux which decreases rapidly along the line 76 (Figs. 4 and 5) and reaches zero in an interval c which, in the case of the clutch above described, is .0083 of a second. At this time, the parasitic flux is neutralized completely and the clutch is fully released. By virtue of the excess energy delivered to the clutch system by selection of the proper capacity values of the condenser 63 as described above, there is a slight reversal 73 of the flux in the clutch iron, this being utilized advantageously to neutralize any tendency for residual magnetism to remain in the clutch iron. It has been found that the reverse flux has no other effect than to dissipate residual magnetism and that the torque of the clutch disappears with the flux so that the clutch is fully reelased when the flux reaches zero at 77.

As shown in Figs. 4 and 6, the energy delivered to the brake winding 35 is equally effective in producing a rapid rise 78 of the current to 9 amperes thus overcoming the opposition offered by the brake magnet to building up of the flux therein to the desired full value. Accordingly, the flux builds up rapidly along the line 79 and attains substantially its full value in an interval d which is .0083 of a second in the case of the 15 inch magnet and substantially equal to the interval c required for full decay of the clutch flux. Thus, the full retarding torque of the brake is achieved in an interval of the same length as is required to neutralize the parasitic flux in the clutch.

By selecting a proper capacity value for the condenser 57, effective deenergization of the relay 44 and connection of the brake winding to the low voltage source may be delayed until after a substantial part of the stored energy has been dissipated but nevertheless caused to occur before the brake flux has built up to its peak value 84 (Fig. 8) and decayed substantially as indicated at 85 as it will when the condenser capacity is too high. It is desirable therefore to choose a value of the condenser 57 which will result in deenergization of the relay 44 and closure of the normal energizing circuit through the switch 43 and the brake winding 35 at or slightly before the peak flux is attained at 84. A 30 microfarad condenser has been found to be satisfactory in producing the desired timing as indicated by the line 79 (Figs. 3 and 8) with the relay used so that the energization of the brake winding at normal voltage produces a continued rise of the brake flux along the line 86 beginning at the peak 84 which is produced by the energy delivered from the capacitor 63.

The closure of the low voltage brake circuit in relation to the discharge of the condensers 63 need not be timed accurately in the present instance because of the presence of the rectifier 38 and its ability to act as a one-way valve in preventing diversion of the high voltage energy and loss through the low voltage circuit. Thus, the action of the relay 44 may be such as to close the switch 43 well in advance of the flux peak 84 without changing the flux curve 79, 86. Of course, it is desirable to minimize the burden thus imposed on the rectifier 38 which is accomplished in this instance by delaying the closure of the normal brake circuit through the action of the condenser 57 as described above.

The complete operation of the mechanism above described is as follows assuming that both relays 44 and 49 are deenergized and the relay armatures are held by their springs in the positions shown in Fig. 2, the brake winding 35 being energized through the switch 43 while the circuit for the clutch winding is open at the switch 56. The condensers 63 are charged by virtue of their continuous connection to the rectifier 67 and the rheostat 55 is set to deliver the desired low voltage, for example 8 volts. The transmission of power to the driven shaft 12 is initiated in response to closure of the start switch 47 which also completes a circuit for the relay 44 through the then closed switch 48. This relay opens the brake circuit at 43 to release the brake and close the clutch circuit at 56. The latter switch also completes a circuit for holding the energization of the relay after opening of the start switch.

The power transmission will be interrupted and the shaft 12 and the other driven parts will be stopped quickly upon closure of the stop switch 51 and the resulting energization of the relay 49 is maintained through the switch 52. This relay opens the switch 54 to break the normal energizing circuit for the clutch winding and, in the continued movement of the relay armature, the switch 65 is closed at 87 (Fig. 5). The energy stored in the condensers 63 is discharged serially through the clutch and brake windings causing rapid decay of the clutch flux at 76 and building up the brake flux at 79.

The clutch is released completely in .0083 of a second as indicated at c by which time the condenser 57 will have been discharged and the relay 44 will, as a result of opening of its holding circuit at 48 by the relay 49, become fully deenergized so as to close its switch 43 just before the brake flux created by the discharged energy reaches its peak 84. Energization of the brake winding will thus be continued at full value from the low voltage source 38 as indicated at 86. As an incident to the deenergization of the relay 44, the switch 56 will be opened thus breaking the holding circuit for the relay 49. The resulting deenergization of the latter opens the switch 65 thus isolating the condensers 63 which then become recharged.

By forcing the decay of the magnetic flux in the iron of the clutch and assisting the build up of the brake flux, the present invention makes it possible to effect complete release of the clutch and attain full torque of the brake in only .0083 of a second following interruption of the current in the clutch winding, an interval only 1/46 of the lag (.38 of a second) which would be required without the improved control in a 15 inch clutch and brake having the characteristics described.

The frictional reduction is substantially the same with clutches and brakes having magnets of other sizes. Moreover, this more rapid stopping of the driven part is achieved without a special construction of the magnet structures or the use of heavier wire contacts or slip rings and with switching arrangements not requiring precise timing. The electrical parts are well adapted to withstand the burdens imposed and all may be arranged in a compact enclosed unit.

We claim as our invention:

1. The combination of, two magnets, each having a winding, means including a rectifier providing a first current source, means providing a current source of higher voltage than said first source, first and second circuits respectively operable when closed to connect said windings across said rectifier, a capacitor continuously connected across the higher voltage source, a third circuit extending through said capacitor and said two windings in series to discharge the capacitor therethrough, a relay adapted when energized to close said first circuit and open the second circuit and when deenergized to open the first circuit and close the second circuit, a relay adapted when energized to close said third circuit and deenergize said first relay, switching means controlling the energization of said relays, and a capacitor in parallel with the winding of said first relay and operable to delay the decay of the current therein following interruption of the relay circuit until the flux produced in the second magnet by the energy delivered from said capacitor is near its peak value.

2. The combination of, two electromagnets, each having a winding, means providing low and high current sources, first and second circuits respectively operable when closed to connect either of said windings across said low voltage source, a capacitor adapted to be charged from said high voltage source, a third circuit extending through said capacitor and said two windings to discharge the capacitor therethrough, a relay adapted when energized to close said first circuit and open the second circuit and when deenergized to open the first circuit and close the second circuit, a relay adapted when energized to close said third circuit and deenergize said first relay, switching means controlling the energization of said relays, and a capacitor in parallel with the winding of said first relay and operable to delay decay of the current therein following interruption of the relay circuit.

3. The combination of, an electromagnet adapted to be rendered active upon energization of its winding, a rectifier, means providing high and low voltage sources, a circuit operable when closed to connect said winding across said rectifier to energize said winding, a capacitor charged from said high voltage source, a circuit extending through said capacitor and winding to discharge the capacitor therethrough, a relay adapted when deenergized to close said first circuit, a relay adapted when energized to close said second circuit and deenergize said first relay, switching means controlling the energization of said relays, and a capacitor in parallel with the winding of said first relay and operable to momentarily delay the decay of the current therein following interruption of the relay circuit but to cause closure of said first circuit before the magnetic flux produced in said magnet by said first capacitor discharge has decreased appreciably from its peak value.

4. The combination of, two magnets having winding, start and stop switches, means providing a source of electrical voltage, circuits operable in response to actuation of said start switch to apply said voltage to one of said windings and deenergizing the second winding and operable in response to actuation of said stop switch to deenergize the first winding and apply said voltage to said second winding, a condenser, a normally open circuit for connecting said condenser in series with said first and second windings and adapted to be closed in response to closure of said stop switch, a source of higher voltage, and means connecting said higher voltage continuously across the terminals of said condenser.

5. The combination of, two electromagnetic devices each having a substantially solid iron flux circuit enclosing its winding, means providing two current sources at different voltages, circuits operable selectively to connect either of said windings across the lower voltage source while maintaining the other winding disconnected therefrom, a capacitance continuously connected across the higher voltage source, a separate circuit extending through said capacitance and said two windings in series, means for closing said separate circuit substantially simultaneously with the disconnection of one of said windings from said low voltage source, and means operable during such discharge to apply the lower voltage to the other of said windings alone.

6. The combination of, two electromagnetic devices each having a substantially unlaminated flux circuit, means providing two current sources at different voltages, circuits operable selectively to connect either of said windings across the lower voltage source while maintaining the other winding disconnected therefrom, a capacitance energized from the higher voltage source and adapted to store an amount of energy corresponding to the combined opposition of said flux circuits to the decay and build-up of magnetic flux therein, means operable substantially simultaneously with the disconnection of one of said windings from said low voltage source to discharge said capacitance in a reverse direction through such winding and also through the other winding, and means operable during such discharge to connect said other winding across said low voltage source to continue the flow of current therethrough in the same direction.

7. The combination of, a direct acting electromagnetic device having a winding, a circuit adapted when closed to energize said winding at one voltage, a second circuit through said winding including a capacitor for storing a predetermined quantity of electrical energy, means by which said capacitor may be charged at a higher voltage, means for closing said second circuit to discharge said stored energy through said winding, and means operable in response to the closure of said second circuit to close said first circuit after partial discharge of said stored energy but before the flux produced thereby in said magnetic elements has receded appreciably from its peak value, said last mentioned means including a relay deenergized as an incident to closure of said second circuit and having a condenser connected in parallel across the relay winding.

8. The combination of, a direct acting electromagnetic device having a winding, a circuit adapted when closed to energize said winding at one voltage, a second circuit through said winding including a capacitor for storing a predetermined quantity of electrical energy, means by which said capacitor may be charged at a higher voltage, means for closing said second circuit to discharge said stored energy through said winding, and means operable in response to the closure of said second circuit to close said first circuit after partial discharge of said stored energy but before the flux produced thereby in said magnetic elements has receded appreciably from its peak value.

9. The combination of, an electromagnetic device having a winding, means including a rectifier adapted to provide a voltage source, a circuit adapted when closed to connect said winding across said voltage source and energize the winding at a first voltage, a second circuit through said winding including a capacitor, means for changing said capacitor for delivery of energy at a voltage higher than said first mentioned voltage, and means for closing both of said circuits simultaneously to discharge said capacitor through said winding and then continue the energization of the winding through said first circuit, said rectifier acting to block dissipation of the stored energy through said first circuit.

10. The combination of, an electromagnet having a winding and a substantially unlaminated magnetic flux circuit enclosing the winding, a circuit through which said winding may be energized at one voltage, a capacitor for storing electrical energy for delivery at a voltage substantially higher than said one voltage and in an amount substantially equal to the energy represented by the parasitic flux persisting in the iron of the magnet following deenergization of said winding, means for charging said capacitor to impart said energy thereto, and means for interrupting the normal current flow in said winding and substantially simultaneously discharging said stored energy through the winding in a direction to neutralize said parasitic flux.

11. The combination of, an electromagnet having magnetic elements and a winding, a circuit adapted when closed to energize said winding at one voltage, a separate circuit through said winding including a capacitor, means operable while said winding is energized through said first circuit to charge said capacitor with energy for delivery at a voltage substantially higher than said one voltage, and means for interrupting said first circuit and substantially simultaneously discharging said capacitor through said winding in a direction reverse to the previous flow of current therein.

12. The method of effecting quick disabling of one electromagnet energized from one voltage source and full magnetization of a second magnet, said method comprising, storing a predetermined amount of electrical energy at a substantially higher voltage, interrupting the flow of current from said first source through the winding of said first electromagnet, substantially simultaneously discharging said stored energy serially through the windings of the two magnets in a direction reverse to the previous current flow in the winding of the first magnet, and during such energy discharge, connecting the winding of the second magnet across said first voltage source to continue the current flow therein in the same direction after dissipation of the stored energy.

13. The method of controlling an electromagnet having a winding and a substantially unlaminated magnetic flux circuit enclosing the winding, said method comprising normally energizing the winding at one voltage, storing electrical energy at a higher voltage and in an amount substantially equal to the energy represented by the parasitic flux persisting in the iron of the magnet following deenergization of said winding, interrupting the normal current flow in said winding to disable the magnet and substantially simultaneously discharging said stored energy through the winding in a direction to neutralize said parasitic flux.

14. The method of controlling an electromagnet having magnetic elements and a winding surrounded by the elements, said method including the steps of, storing electrical energy at one voltage and in an amount corresponding to the resistance offered by the iron of said elements to the building up of magnetic flux following energization of said winding, discharging said stored energy through the winding in one direction, while said energy is being delivered to said winding, applying a lower voltage to the winding in the same direction as said stored energy, and continuing the application of said lower voltage after dissipation of said stored energy within said elements.

15. The method of effecting quick disabling of one electromagnet energized from a voltage source and a quick build-up of flux in the magnetic elements of a second electromagnet, said method comprising, storing a predetermined amount of electrical energy for delivery at a voltage substantially higher than the voltage of said source, interrupting the flow of current from said source through the winding of said first electromagnet while substantially simultaneously delivering to the winding of said first electromagnet and in a direction reverse to the previous flow of current therein a portion of said stored energy sufficient to accelerate the decay of the flux in the magnetic elements of the first electromagnet and, substantially simultaneously with delivery of said portion of said energy, delivering another portion of the stored energy to the winding of the second electromagnet to effect a rapid build-up of the flux in the magnetic elements of the latter electromagnet.

16. The combination of, an electromagnet having a winding, a circuit through which said winding may be energized at one voltage, a second electromagnet having a magnetic element and a winding carried by the element, a separate second circuit through said second winding including a capacitor for storing energy in a predetermined amount sufficient to provide a quick build-up of flux in said element when the second circuit is closed for discharge of said energy through the second winding, means for charging said capacitor with said energy for delivery at a voltage substantially higher than the voltage applied to said first winding, and means operable as an incident to deenergization of said first winding and substantially simultaneously therewith to close said second circuit and discharge energy stored in said capacitor through said second winding whereby to accelerate the flux build-up in the magnetic elements of said second electromagnet.

17. In a method of correlating the operation of two electromagnets each having a winding and magnetic elements, the steps of, energizing one of said windings at one voltage; maintaining the second one of said windings deenergized while said first winding is energized, storing, during such energization of the first winding, electrical energy for delivery at a voltage substantially higher than said first voltage, and discharging said stored energy through said second winding as an incident to and substantially simultaneously with deenergization of said first winding whereby to effect rapid build-up of the flux in the magnetic elements of the second electromagnet.

18. The combination of, an electromagnetic device having magnetic elements and a winding carried by one of the elements, a circuit adapted when closed to energize said winding at one voltage and thereby cause current of a predetermined value to flow in the winding, a second circuit through said winding including a capacitor for storing electrical energy in an amount sufficient, when said second circuit is closed, to cause current of a value higher than said predetermined value to flow in said winding, means for charging said capacitor with energy for delivery at a voltage higher than said one voltage, and means for closing said circuits to discharge through said winding the energy stored in said capacitor and then continue the energization of the winding through said first circuit before substantial decay of the flux produced by the discharged energy.

References Cited in the file of this patent

UNITED STATES PATENTS

| Number | Name | Date |
|---|---|---|
| Re. 23,217 | Snyder | Apr. 4, 1940 |
| 1,155,124 | Berger | Sept. 28, 1915 |
| 1,737,846 | Hodgson | Dec. 3, 1929 |
| 2,206,823 | Wertz | July 2, 1940 |
| 2,427,750 | Snyder | Sept. 23, 1947 |
| 2,436,102 | Douglas | Feb. 17, 1948 |
| 2,504,996 | MacDonals | Apr. 26, 1950 |

FOREIGN PATENTS

| Number | Country | Date |
|---|---|---|
| 461,203 | Great Britain | Feb. 12, 1937 |